United States Patent [19]
Wallace et al.

[11] Patent Number: 5,640,405
[45] Date of Patent: Jun. 17, 1997

[54] MULTI QUASI PHASE MATCHED INTERACTIONS IN A NON-LINEAR CRYSTAL

[75] Inventors: Richard W. Wallace, Los Altos; Walter R. Bosenberg, Sunnyvale; Jason I. Alexander, Foster City, all of Calif.

[73] Assignee: Lighthouse Electronics Corporation, Mountain View, Calif.

[21] Appl. No.: 593,134

[22] Filed: Feb. 1, 1996

[51] Int. Cl.$^6$ .................. H01J 3/10; G02F 1/35
[52] U.S. Cl. .................. 372/21; 372/22; 372/23; 372/94; 372/98; 372/99; 372/108; 359/330
[58] Field of Search ............... 372/21, 22, 23, 372/92, 93, 94, 97, 98, 99, 108; 359/330, 328, 329

[56] References Cited

U.S. PATENT DOCUMENTS

| | | | |
|---|---|---|---|
| 4,525,843 | 7/1985 | Diels | 372/94 |
| 5,027,361 | 6/1991 | Kozlovsky et al. | 372/22 |
| 5,117,126 | 5/1992 | Geiger | 372/21 X |
| 5,175,739 | 12/1992 | Takeuchi et al. | 372/45 |
| 5,195,104 | 3/1993 | Geiger et al. | 372/97 |
| 5,321,718 | 6/1994 | Waarts et al. | 372/108 |
| 5,343,485 | 8/1994 | Okazaki | 372/22 |
| 5,365,539 | 11/1994 | Mooradian | 372/75 |
| 5,450,429 | 9/1995 | Klemer et al. | 372/22 |
| 5,457,707 | 10/1995 | Sobey et al. | 372/20 |
| 5,506,860 | 4/1996 | Hyuga et al. | 372/98 |
| 5,524,011 | 6/1996 | Lawandy | 372/22 |

OTHER PUBLICATIONS

Fejer et al., "Quasi-phase-matched second harmonic generation: tuning and tolerances," *IEEE Journal of Quantum Electronics*, vol. 28, 1992, pp. 2631–2654.

Bosenberg et al., "Single-frequency optical parametric oscillator," *Applied Physics Letters*, vol. 61, 1992, pp. 387–389.

Wu, "High-efficiency and compact blue source: intracavity frequency tripling by using LBO and BBO without the influence of birefringence", *Applied Optics*, vol. 32, 1993, pp. 971–975.

Wu et al., "Intracavity fourth harmonic generation using three pieces of LBO in a Nd:YAG laser," *OSA Proceedings on Advanced Solid-State Lasers*, eds. Fan et al., vol. 20, 1994, pp. 377–380.

Mead et al., "Optical parametric oscillator-based laser source contiuosly tunable from 250 to 400 nm," *OSA Proceedings on Advanced Solid-State Lasers*, eds. Fan et al., vol. 20, 1994, pp. 381–384.

Kaz et al., "Non-critically phase-matched 289 nm generation," *OSA Proceedings on Advanced Solid-State Lasers*, eds. Fan et al., vol. 20, 1994, pp. 385–388.

(List continued on next page.)

*Primary Examiner*—Brian Healy
*Attorney, Agent, or Firm*—Charles S. Guenzer

[57] ABSTRACT

A laser system in which an intense laser beam of a predefined pumping wavelength traverses a non-linear material, such as crystalline lithium niobate, that has been impressed with one or more quasi phase matching (QPM) gratings is disclosed. Quasi phase matching compensates for the dispersion or birefringence in a non-linear material by modulating the non-linearity with the proper period such that the different wavelengths involved in the non-linear process stay in phase over a long interaction length. The first QPM grating promotes the parametric generation of a resonant signal whose wavelength is determined by the grating period. According to the invention, either a second QPM grating impressed in the same medium or a different order of the first QPM grating promotes the non-linear interaction between the resonant signal and another optical signal traversing the non-linear material. The multi-step process allows efficient generation of high power radiation in wavelength regions, such as the blue, or red, not easily accessible otherwise.

29 Claims, 5 Drawing Sheets

OTHER PUBLICATIONS

Bortz et al., "Quasi-phase-matched optical parametric amplification and oscillation in periodically poled LiNbO$_3$ waveguides," *Optics Letters*, vol. 20, 1995, pp. 49–52.

Myers et al., "Quasi-phase-matched 1.064-μm-pumped optical parametric oscillator in bulk periodically poled LiNbO$_3$," *Optics Letters*, vol. 20, 1995, pp. 52–53.

Myers et al., "Quasi-phase-matched optical parametric oscillators using bulk periodically poled LiNbO$_3$," *Journal of the Optical Society of America B*, Nov., 1995, pp. 2102–2116.

Lim et al, "Second-harmonic generation of green light in periodically poled planar lithium niobate waveguide," *Electronics Letters*, vol. 25, 1989, pp. 174, 175.

MULTI QUASI PHASE MATCHED INTERACTIONS IN A NON-LINEAR CRYSTAL

FIELD OF THE INVENTION

The invention generally relates to solid-state lasers. In particular, the invention relates to non-linear optical interactions providing optical output signals of different frequency than the optical input signals.

BACKGROUND OF THE INVENTION

Many commercially important applications require laser radiation in parts of the optical spectrum for which there are no readily available efficient and compact laser diodes or solid-state lasers pumped by laser diodes. For example, tri-color (red, green and blue or RGB) lasers are desired for various visual display applications. The optimal wavelength range for the blue is between about 440 nm and 460 nm, for the green it is between 510 nm and 540 nm, and for the red it is between 610 nm and 630 nm. It is desirable that these lasers be compact and either be solid-state lasers or as a minimum comprise solid-state lasers pumping another solid-state laser material. A minimum optical output power level of greater than a watt for each of the colors is required for many applications.

One completely solid-state design uses a very efficient and powerful GaAlAs laser diode emitting close to 800 nm to pump a neodymium (Nd) ion incorporated in a host formed in a bulk rod or other structure. The neodymium ion will cause lasing at various wavelengths in the near infrared, which wavelengths can then be frequency doubled into the visible spectrum using a non-linear crystal for second harmonic generation (SHG). The most popular host for neodymium is yttrium aluminum garnet (YAG) The most efficient line for Nd:YAG occurs at 1064 nm, the second harmonic of which produces an excellent green source at 532 nm. Nd:YAG will also lase at 946 nm. This wavelength, when frequency doubled to 473 nm, is slightly outside the desired blue wavelength band. However, if the YAG is replaced by a vanadate host, the transition is shifted to 914 nm, thus producing a second harmonic at the more desirable 457 nm. Unfortunately, the Nd transition that produces these low 900 nm wavelengths has a terminal lasing level which is partially populated at room temperature making the laser a more difficult system than one based on the stronger 1064 nm line or similar lines in other Nd host materials.

The red color presents a much greater problem than the blue. Nd:YAG has a transition at 1319 nm, which, when frequency doubled to 659 nm, is too red for high sensitivity by the human eye. Other possible hosts, such as vanadate or yttrium lithium fluoride (YLF), do not solve this problem. It is possible that III–V semiconductor lasers can be compositionally tailored for the desired wavelengths, but at the present time they emit outside of the desired range, especially when they are designed to output high power in the diffraction limited mode.

Another approach for attaining the red color uses sum-frequency techniques entailing different laser lines, or a sum frequency of one laser line and another frequency generated by a different process, such as an optical parametric oscillator (OPO). All known versions of this approach require lasers at multiple wavelengths or a single laser and multiple non-linear devices to produce the desired frequency.

Since solid-state Nd:YAG lasers operating at 1064 nm and pumped by diode lasers are now commercially available with diffraction-limited powers in excess of ten watts, it is highly desirable to use this type of laser in conjunction with a simple and efficient non-linear device to generate a coherent red beam in the wavelength range of 610 nm to 630 nm, and also for other particular wavelengths in the visible, IR and UV, especially in the desired 440 nm to 460 nm blue region.

SUMMARY OF THE INVENTION

The present invention includes one non-linear medium that accomplishes two or more non-linear quasi-phase matches. Thereby, the single medium allows a complex interaction best described in terms of a two-step interaction in which one of the quasi phase matches produces a high intensity signal of a first generated frequency and this signal then produces another signal of a second generated frequency. Thereby, new areas of the optical spectrum can be accessed. In particular, when the doubly quasi- phase-matched non-linear medium is pumped for parametric gain by a Nd:YAG laser operating at 1064 nm, it can generate visible coherent radiation in the wavelength range of 610 nm to 630 nm. A more specific implementation includes a periodically poled $LiNbO_3$ crystal to quasi-phase match the OPO pump and a resonant signal in the range of 1400 nm to 2000 nm and to simultaneously phase match the resonant signal and the pumping energy. Thereby, CW pumping of the frequency-shifted output is accomplished. The remaining nonresonant OPO idler is also available to generate other CW frequency-shifted output and can be conveniently used in sum with a green beam to generate the blue beam in an RGB display system.

DETAILED DESCRIPTION OF THE PREFERRED EMBODIMENTS

The invention relies upon a dual quasi-phase-matched non-linear crystal to generate strong radiation in parts of the optical spectrum not previously accessible by simpler interactions.

Quasi phase matching is a technique for phase matching non-linear processes to generate optical waves that have wavelengths different from the optical waves generating them. Quasi phase matching has been described by Fejer et al. in "Quasi-phase-matched second harmonic generation: tuning and tolerances," IEEE *Journal of Quantum*

Electronics, vol. 28, 1992, pp. 2631–2654. A more recent paper describing the more general three-frequency process is by Myers et al. in "Quasi-phasematched optical parametric oscillators using bulk periodically poled LiNbO₃," *Journal of Optical Society of America B*, vol 12, 1995, pp. 2102–2116.

Figure 1:
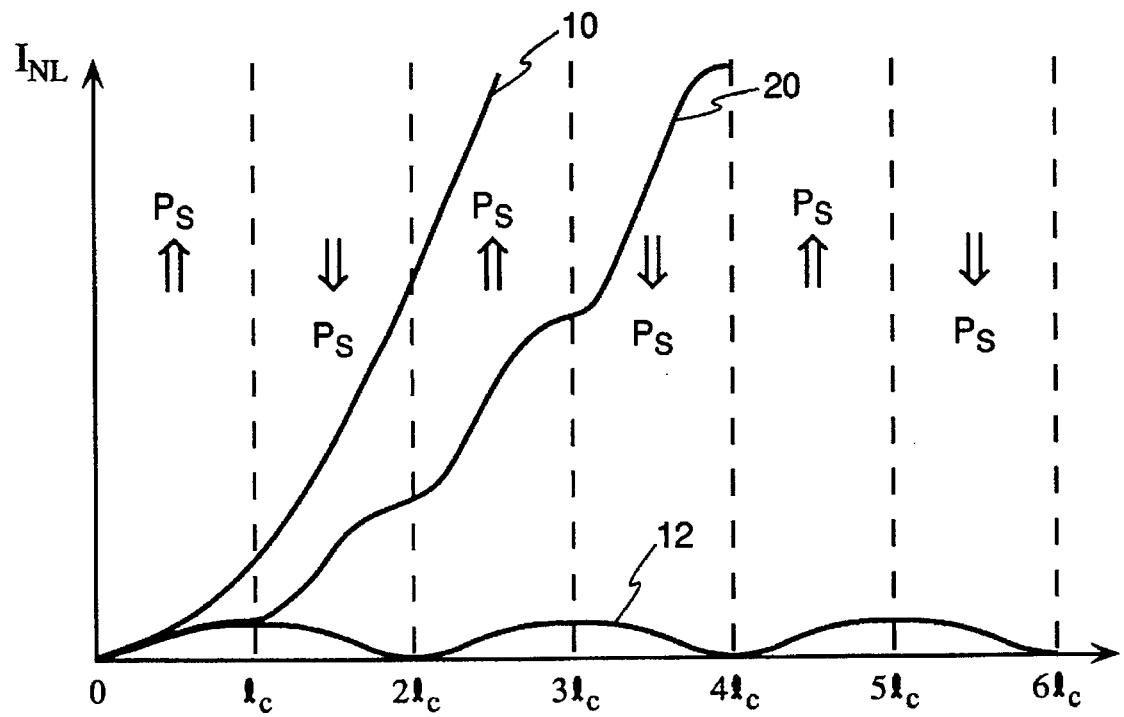
FIGS. 1 and 3 are graphs illustrating the mechanism of quasi phase matching.

In general, non-linear processes involve the interaction of two intense optical signals propagating collinearly through a non-linear medium to generate a third optical signal at a new desired frequency. The non-linear interaction produces optical waves having frequencies equal to the sums and differences of the input signals. If one of these sum or difference frequency waves maintain the proper phase relationship with the input signals, then the intensity $I_{NL}$ of the non-linearly generated wave will grow quadratically along the propagation direction, as shown in trace 10 of the graph of FIG. 1. The requirement for sum and difference frequencies only is called "energy conservation" and is mathematically expressed as $$\omega_1 + \omega_2 = \omega_3 \tag{1}$$

where $\omega_1$, $\omega_2$, and $\omega_3$ represent the frequencies of the three different signals involved. Second harmonic generation is a case of sum frequency generation where $\omega_1$ and $\omega_2$ are equal. Optical parametric gain is where $\omega_3$ is put in as an intense pump and the other two waves are generated from the residual noise. In this case, the two generated signals are referred to as the signal and idler outputs.

A fundamental problem with non-linear optical processes, however, is that the non-linear optical coefficients are relatively small so that the various input and generated signals need to interact over relatively long distances in order that significant energy be transferred between the different optical waves. Long interaction lengths with good energy transfer require a predetermined phase relationship between the three waves. This phase relationship or phase matching or momentum matching is expressed as $$k_1 + k_2 = k_3 \tag{2}$$

where $k_i = \omega_i n_i / c$, $\omega_i$ and $n_i$ being the frequency and material refractive index, respectively, at the i-th wavelength. c is the velocity of light in free space. But, the signals, because of their different wavelengths or possibly polarizations, are likely to experience significantly different refractive indices, which vary with both wavelength and polarization. The variation with wavelength is called dispersion, and the variation with polarization is called birefringence. Typically, the intensity $I_{NL}$ of the non-linearly generated wave oscillates with a form shown by trace 12 of FIG. 1. Thus, unless other measures are taken, the three signals progressively fall out of phase. For instance, they fall out of phase by a phase angle of π redlens over a coherence length $I_c$. For second harmonic generation, $$l_c = \frac{\lambda}{4(n_{SHG} - n_{FND})} \tag{3}$$

where λ is the wavelength of the fundamental, and $n_{SHG}$ and $n_{FND}$ are the material refractive indices at the second harmonic and fundamental waves. In broadly stated terms, if the two waves were in phase in the first coherence length, they are out of phase in the second coherence length. If the non-linear medium remains the same throughout the length, power is transferred from the input signal to the output signal in one coherence length but is transferred in the other direction in the next coherence length. Fortunately, there are a few situations where the coherence length can be made very long and efficient energy transfers can occur. Such a condition would occur in Equation (3) if $n_{SHG}$ and $n_{FND}$ became equal. In the general case, the coherence length is of insufficient length in view of the very small non-linear optical coefficients if significant amounts of optical outputs are required.

Figure 2:
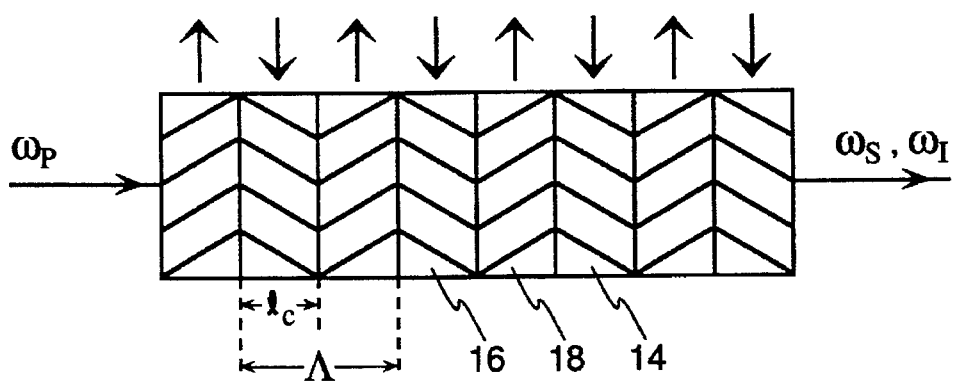
FIG. 2 is a schematic cross-sectional view of a quasi-phase-matching periodically poled grating, as practiced in the prior art.

Quasi-phase matching (QPM) circumvents this problem, as illustrated in the schematic cross section of FIG. 2 and described in the article of Myers et al. ibid. by modulating the non-linearity of the medium with a period Λ that is twice the coherence length. This can be mathematically expressed as $$\Lambda = 2l_c = \frac{2\pi}{k_3 - k_2 - k_1} \tag{4}$$

The non-linear medium through which the three waves propagate is divided into alternating domains 16 and 18 each preferably of length equal to the coherence length $I_c$. The sign of the non-linear coefficient is reversed every coherence length along the propagation direction, represented by the arrows in FIG. 1. Power is transferred from the two input signals if it is a sum or difference process or from the pump source at $\omega_3 = \omega_P$ to $\omega_1 = \omega_S$ and $\omega_1 = \omega_i$ if it is an optical parametric oscillator (OPO) operation growing according to trace 20 of FIG. 1. It is noted that the alternating domains do not keep the optical signals in phase, but only assure that non-linear power transfer is always from the input to the output waves.

Figure 3:
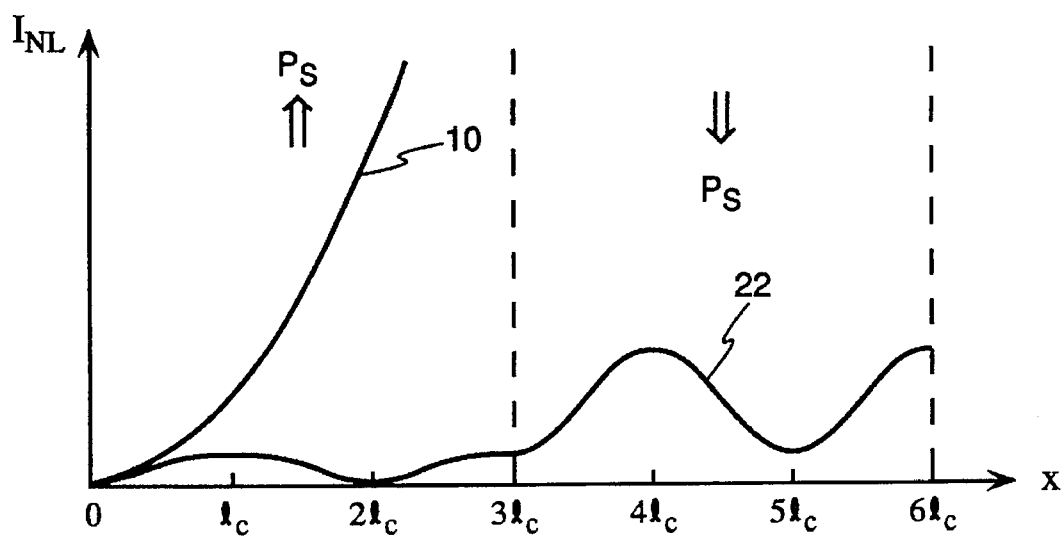

Odd-numbered, higher-order quasi-phase matching is also possible. Trace 22 in FIG. 3 shows the growth of the non-linear intensity $I_{NL}$ for third-order quasi phase matching in which the non-linearity is changed every third coherence length $I_c$.

Myers et al. ibid. and the references cited therein describe the theory and history of QPM OPOs. Myers et al. describe an optical parametric oscillator embodied in crystalline LiNbO₃ with all the pump, signal, and idler waves being extraordinary waves polarized along the z-direction of LiNbO₃ and propagating within the LiNbO₃ wafer along its x-direction to take advantage of the large non-linear coefficient $d_{33}$. Thus, phase matching is required to compensate dispersion, but the first-order refractive indices of LiNbO₃ are relatively flat in the infrared portion of the spectrum. When the OPO is pumped by the powerful diode-pumped Nd:YAG laser at $\lambda_p = 1064$ nm, the QPM grating period Λ is in the comfortable neighborhood of 10 to 30 μm. As will be described later, such grating periods are easily achieved in bulk LiNbO₃ by an electrical poling process. The description of the OPO of Myer et al. has been included as an exemplary illustration and not as a limitation on the present invention.

According to the invention, a single quasi-phase-matched non-linear medium is impressed with multiple phase matching periods to achieve multiple non-linear phased matched operations in the same crystal. Multiple QPM gratings incorporated into a single medium avoids optical losses occurring at the air/medium interface when multiple non-linear media are used having respective QPM gratings impressed respectively thereupon, but the concept of the invention could be implemented with multiple QPM grating crystals. Such a situation might be required if the second process requires gratings that could only be implemented in a different crystal from the first, for example, KTP.

Figure 4:
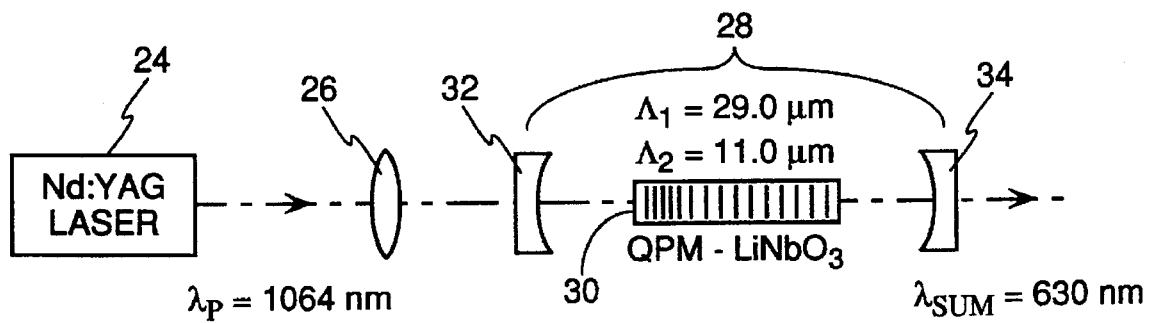
FIG. 4 is a schematic illustration of an embodiment of the optical generator of the invention.

An embodiment of the invention is illustrated in FIG. 4. A high-intensity diode-pumped Nd:YAG solid-state laser 24, continuously emits a pump beam at $\lambda_p = 1064$ nm. For example, Model 220 available from Lightwave Electronics, Inc. of Mountain View, Calif., generates CW $TEM_{oo}$ radiation at this wavelength at average powers of up to about 13 W. A lens 26 focuses the pump beam into a resonant cavity 28 including a quasi-phase-matched non-linear medium 30, preferable a $LiNbO_3$ crystal, located between a cavity entrance mirror 32 and a cavity exit mirror 34.

The lens 26 has a focal length of 150 mm and focuses the pump beam to a 122 μm diameter spot in the center of the $LiNbO_3$ crystal 30. The cavity mirrors 32, 34 have inner radii of curvature of 25 cm and are separated from each other by 68 mm, which produce a diameter in the $LiNbO_3$ crystal 30 of 134 μm at a resonant signal wavelength of 1540 nm. The inner surfaces of the cavity mirrors 32, 34 are coated with a multi-layer dielectric coating with attention paid to four important wavelength bands. Both dielectric coatings have a reflectivity of greater than 99% in the band between 1450 nm and 1600 nm, the band for the OPO signal $\omega_S$, and greater than 85% transmitting in the band between 4000 nm and 3180 nm the band for the OPO idler, $\omega_i$. An OPO with only one of its two wavelengths resonant is called a singly resonant oscillator or SRO. As is well know, SROs have many desirable properties over the doubly resonant oscillator. An additional requirement on input mirror 32 coating is high transmission at the 1064 nm pump wavelength (>80%), and on the output mirror 34 coating is high transmission in the red portion of the spectrum(>80%), the band of the desired output.

Figure 5:
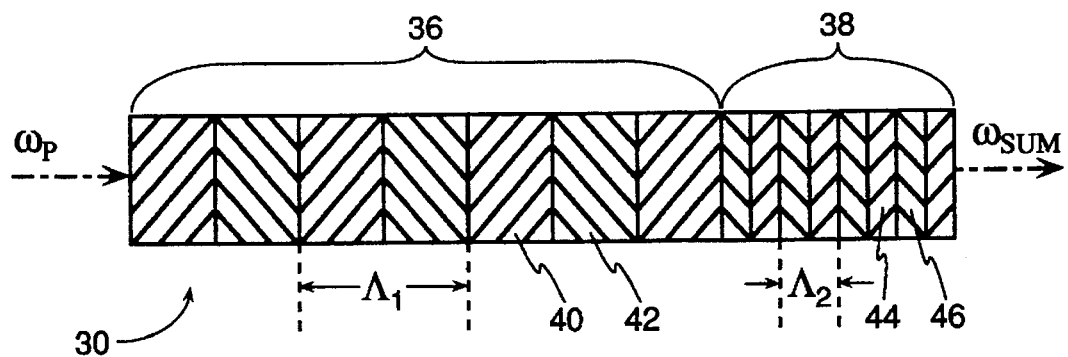
FIG. 5 is a schematic cross-sectional view of a dual quasi-phase-matching grating of the invention.

The $LiNbO_3$ crystal 30 is formed from crystalline, z-axis oriented, $LiNbO_3$ wafer material. Its end facets are polished flat and covered with a single quarter-wave layer of $SiO_2$ of a thickness to serve as an anti-reflection coating for a center wavelength of 1540 nm. A more complex anti-reflection coating would be desirable which is not only low loss at 1540 nm but also at the idler wavelength of 3420 nm and the desired red output of 630 nm. As illustrated in the schematic cross section of FIG. 5, the $LiNbO_3$ crystal 30 is poled to have two quasi-phase-matching gratings 36, 38 collinearly arranged along the x-axis of the $LiNbO_3$. One grating 36 has a period of $\Lambda_1=29.20$ μm to generate an OPO with a resonant signal $\omega_S$ of 1545 nm and a non resonant idler signal $\omega_i$ of 3420 nm. The OPO signal is very intense because the mirrors 32, 34 are coated to resonate it within the cavity 28. As a result, it is intense enough to act as a source beam for a second non-linear process. In particular, a sum signal $\omega_{SUM}$ results from the non-linear interaction between the pump signal $\omega_P$ and the OPO resonant signal $\omega_S$ where the frequencies are related as $$\omega_{SUM}=\omega_P+\omega_S \quad (5)$$

The wavelength of the sum signal $\omega_{SUM}$ falls in the red spectrum at 630 nm. The process of Equation (5) is made efficient by the second grating having the period of 11.0 μm, which phase matches the intense resonant signal wave with the entering 1064 nm pump energy. The crystal temperature should be around 200° C. to 250° C. to avoid any photorefractive damage problems.

If the grating periods are changed to 28.0 μm and 10.0 μm, the phase-matched OPO resonant signal $\omega_S$ will have a wavelength of 1430 nm and the associated non-resonant idler $\omega_i$ will have a wavelength of 4161 nm. The resulting visible sum frequency from Equation (5) is then 610 nm.

Returning to FIG. 5, the grating 36 with the longer period $\Lambda_1$ is used for the optical parametric oscillator. Its length should be about 50 mm to give a low OPO threshold. The grating 38 with the shorter period $\Lambda_2$ is used for the summing process. Its length should be about 5 mm. These dimensions are consistent with a 3-inch (75 mm) $LiNbO_3$ wafer. These dimensions also imply that the gratings have several hundreds to more than a thousand of periods. The stated dimensions do assume a pumping level three times above threshold. Other pumping levels will vary the optimum total grating lengths by either creating too much or too little energy at the sum frequency which would put the OPO into an overcoupled or undercoupled situation and thereby reduce the total system performance. It should be noted that the sum generation grating, in most cases, should be placed such that the pump wave interacts with the sum process before interacting with the parametric process. In this way, the pump is much more intense since it has not been depleted by the OPO process.

Experiment

Figure 6:
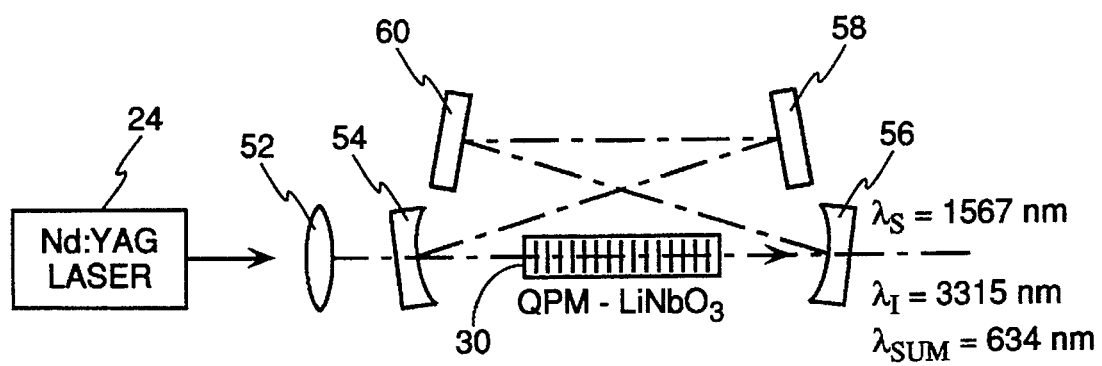
FIG. 6 is a schematic illustration of an alternate embodiment of the optical generator of the invention.

The invention was verified using a $LiNbO_3$ crystal impressed with a single grating, just as illustrated in FIG. 2 and also in a modified ring cavity illustrated in FIG. 6. The $LiNbO_3$ crystal was z-axis oriented and fabricated from a 75 mm wafer. A single grating of periodicity of 29.75 μm was electrically poled into the $LiNbO_3$ crystal by the process described by Myers et al., ibid.

At this period, the QPM grating can be easily achieved by poling of the $LiNbO_3$ in a pattern having a predetermined spatial period. In particular, a digitated electrode grid with a width of 10 μm is applied to one z-directed face of the $LiNbO_3$ wafer chip, and a planar electrode is applied to the opposing face. The grating extends along the x-direction of the $LiNbO_3$ to utilize the large $d_{33}$ non-linear coefficient. A long coercive voltage pulse of 10.5 kV is applied across the 0.5 mm thick chip of $LiNbO_3$, which had previously been uniformly poled in a first direction. The applied field poles the portions under and slightly beyond each electrode to have a polarization in the opposite direction from that of the remainder of the chip. That is, the portions under and near the electrode grid have opposite directions of polarization, and hence have opposite signs for the non-linear coefficient $d_{33}$. Either polarization is stable, and, once the material has been poled, it remains in that polarization. Pump light is propagated within the $LiNbO_3$ wafer chip along the x-axis and with the pump polarization directed along the z-axis. The QPM grating period A can be very precisely controlled by using standard micro-fabrication techniques in the photolithography of the electrode grid. Other ferroelectric materials, such as lithium tantalate and KTP have been periodically poled so that the method appears to be quite general.

Other than the difference in the QPM grating, the structure of the first experimental example followed the structure shown in FIG. 4. The experiments showed that the pump signal $\omega_P$ had to exceed a threshold power of 3 W to achieve OPO oscillation. At a crystal temperature of 170° C. and with the 29.75 μm grating period, the 1064 nm pump $\omega_P$ generated a resonant signal $\omega_S$ at 1567 nm and a non-resonant idler $\omega_i$ at 3306 nm. The idler output was 1.2 W with 13 W of pump power. The pump energy depletion into the signal and idler was 50%.

Because the cavity mirrors are highly reflective at the OPO signal wavelength $\omega_S$, the intensity of this resonant signal inside the cavity is greatly enhanced. It is estimated to be 150 watts. The 29.75 μm grating period is close to the third order summing process between the 1064 nm pump and the 1567 nm resonant signal to produce a sum signal $\omega_{SUM}$ at 634 nm. At the 13 W pumping level, the red signal has an intensity of 10 mW. Calculations show that the effective conversion length for the summing process is only a few coherence lengths $I_c$, that is, a few tens of micrometers. Further calculations indicate that an additional 5 mm summing grating added to the LiNbO$_3$ crystal, as described above, would have increased the unsaturated conversion efficiency to the red beam by 10,000. Accounting for saturation effects, the resulting red beam power should approach more than two watts.

Figure 7:
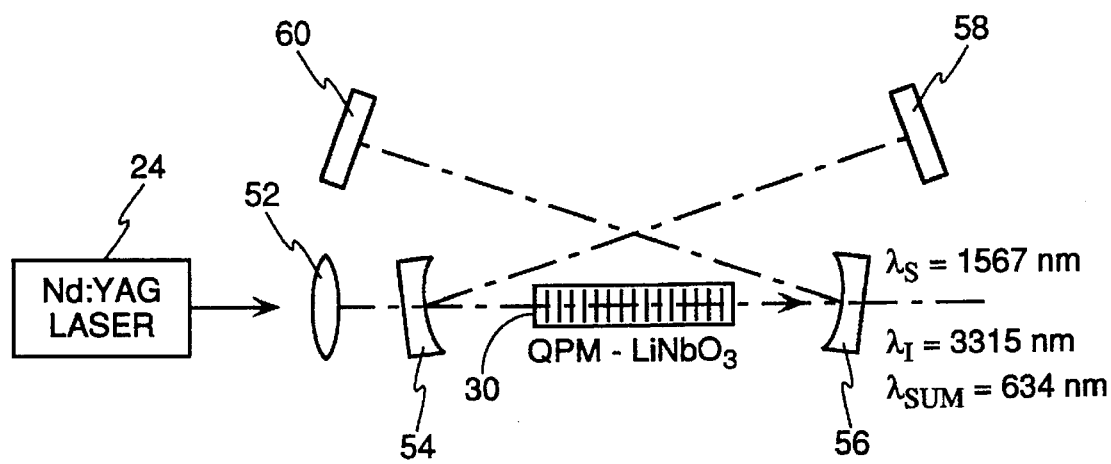
FIG. 7 is a schematic illustration of yet another alternate embodiment of the optical generator of the invention.

Another experiment was conducted with a four mirror cavity, shown in two variations in FIG. 6 and FIG. 7. The cavity of FIG. 6 is in the shape of a bow tie ring. The same LiNbO$_3$ crystal of the FIG. 4 system was used and the beam diameters of the pump and resonant signal were experimentally maintained the same as in the system of FIG. 4. The two curved mirrors 54, 56 have a radius of curvature of 100 mm and are spaced 154 mm apart. The other two mirrors 58, 60 are flats positioned 125 mm from the mirrors 54, 56 and separated by 96 mm. The output mirror 56 has a reflectivity of 99.0% at the resonant signal $\omega_S$ of 1567 nm. The other three mirrors 54, 58, 60 have reflectivities of 99.8% at $\omega_S$. All four OPO mirrors 54, 56, 58, 60 transmit more than 80% of the idler frequency $\omega_S$. With 13.5 watts of pumping power, the signal output power at $\omega_S$ was 1.5 watts and the nonresonant idler power at $\omega_i$ was 3.5 watts. The transfer of pumping energy into the OPO waves was 93%. The sum frequency at 634 nm was 15 mW. The bandwidth of the signal $\omega_S$ of this ring device of FIG. 6 is very narrow, typically running in a single longitudinal mode.

FIG. 7 used the identical optics of FIG. 6. The only difference is that the two flat mirrors have been repositioned to form a linear cavity. The distance between the curved mirrors 54, 56 is increased to 173 mm to maintain the same mode sizes. Pumping threshold for the four mirror linear system is higher but at 13.5 watts of pumping power, the signal and idler outputs and pump depletion were almost identical with the system of FIG. 6. The significant difference is that the linear system of FIG. 7 runs in a broad linewidth of about 2 cm$^{-1}$ so it contains many longitudinal modes at the same signal $\omega_S$. For special reduction in an RGB display system, the linear system with its broader linewidth may be the best implementation.

These systems also simultaneously produced a weaker green beam at a wavelength of 532 nm and a power of 0.5 mW and an even weaker blue beam at a wavelength of 450 nm and a power of 0.01 mW. The 532 nm beam is the second harmonic of the 1064 nm pump signal $\omega_P$ (so that no quasi phase matching was used), and the 450 nm beam is the sum of the resonant signal $\omega_S$ and the 632 nm red beam. Hence, all three colors for an RGB display were generated in a single crystal.

Prior art is known in which two crystals using standard phase-matching techniques of different polarization in birefringent crystals were disposed on the same optical path in combinations inside or outside of laser cavities to produce other desired wavelengths.

Calculations indicate that a similar pair of interactions can be used to generate a red signal closer to the peak of red acuity. The design is based on a 1064 nm pump source, a LiNbO$_3$ crystal temperature controlled to about 450° C., and a single grating pitch of 26.1 μm. The grating will produce first-order quasi phase matching of the pump energy to a resonant signal $\omega_S$ at a wavelength of 1400 nm and third-order quasi phase matching of the 1400 nm and 1064 nm signals to generate a red sum signal $\omega_{SUM}$ at a wavelength of 605 nm. The operating temperature may be higher than desired, but still well within the operating range of LiNbO$_3$.

Figure 8:
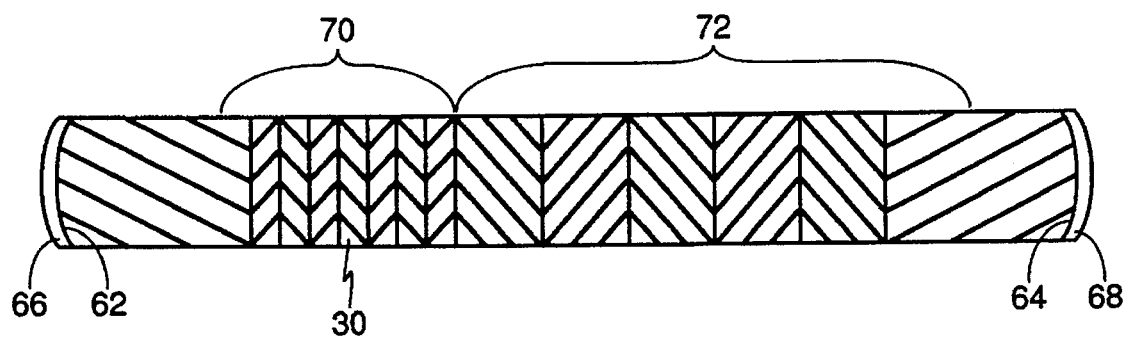
FIG. 8 is a schematic cross-sectional view of a quasi-phase-matching grating of the invention incorporating integrated mirrors.

An improved optical device is illustrated in cross-section in FIG. 8 which incorporates both the mirrors and the active medium into a single monolithic unit. The LiNbO$_3$ crystal 30 has its end facets 62, 64 shaped and polished to replace the external mirrors 32, 34 of FIG. 4. An input mirror 66 and an output mirror 68 are deposited directly on the end facets 62, 64. Both the input and output mirrors 66, 68 should be highly reflecting at the wavelength of the resonant signal $\omega_S$ of the optical parametric oscillator and highly transmitting at the nonresonant idler $\omega_i$. The input mirror 66 should also be highly transparent at the wavelength of the pumping signal $\omega_P$ while the output mirror 68 should be highly transparent at the wavelength of the sum signal $\omega_{SUM}$. The two different gratings 70, 72 are poled into the monolithic LiNbO$_3$ crystal similar to FIG. 4. The shorter period summing grating is placed on the pump side and the longer OPO grating placed on the output side. With this order placement, the pump can interact with the resonant signal wave $\omega_S$ to form the desired sum output before it is depleted by the OPO process.

In principal, the intensity of the sum beam could be increased by making the output mirror 68 be highly reflective at the wavelength of the pump signal so that it makes an additional pass through the non-linear crystal 30 creating a backwardly propagating sum beam and then by making the input mirror 66 be highly reflective at the wavelength of the sum signal so the backwardly propagating sum beam reflects back in the forward direction to recombine with the other sum beam. This configuration may require an isolator between the pump laser 24 and the input mirror 66 of the LiNbO$_3$ crystal 30 to suppress any instabilities that the backwardly propagating pump energy may create in the laser.

If is possible to form more sophisticated QPM grating patterns than a simple single or double grating. Fejer et al., ibid. at pp. 2645–2648 describe various techniques for broadening a QPM tuning curve.

In the broadest aspect of the invention, the dual non-linear quasi-phase-matching process is not limited to optical parametric oscillation for one of the steps. Indeed, it is possible for the QPM grating to promote three non-linear processes. Three gratings of differing pitch could be impressed on a single crystal. It should also be appreciated, particularly in view of the examples in which a single grating promotes multiple processes, that the processes need not be considered as being serially performed in a dependent relationship but can be concurrently performed in a related, interdependent relationship.

Preferably, a first step of the multi-step non-linear process of the invention, that is, the step involving only the pump source and one grating, involves optical parametric oscillation since the OPO provides nearly complete freedom in generating an intense optical wave of chosen wavelength. It is possible, further, that the second step involves a second OPO process in which the first OPO wave acts as the pump.

Figure 9:
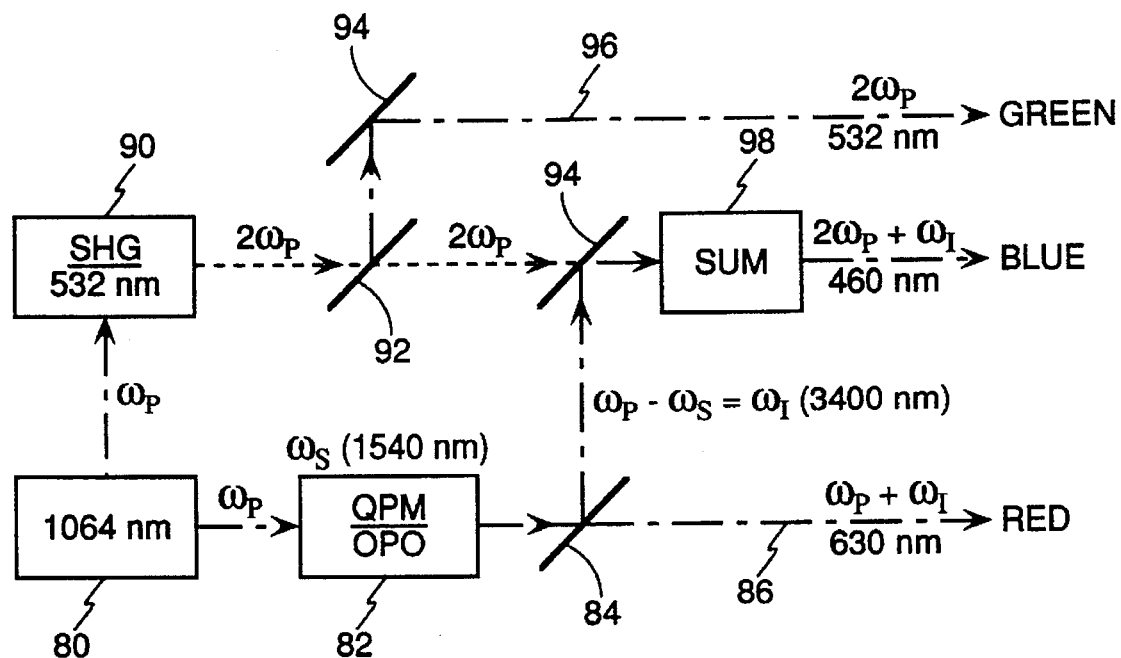
FIG. 9 and 10 are schematic block diagrams of laser systems of the invention producing multi-wavelength outputs.

The invention allows one or two lasers to optically power a three-color display. As shown in the schematic of FIG. 9, a diode-pumped Nd:YAG laser 80 emits a laser beam at a wavelength of 1064 nm (corresponding to a pump frequency $\omega_P$), and the beam traverses an optical parametric oscillator 82 including a non-linear crystal. having a QPM grating period $\Lambda_i$, of about 29.2 μm for LiNbO$_3$, poled in the crystal. The parametric process produces resonant output signal $\omega_S$ of wavelength 1540 nm and a non-resonant idler $\omega_i$ of wavelength 3400 nm. The non-linear crystal has a second QPM grating with period $\Lambda_2$ equal to about 11 μm in LiNbO$_3$, which quasi phase matches a non-linear summing interaction between the pump signal $\omega_P$ and the resonant signal $\omega_S$ to produce a red output signal $\omega_{RED}=\omega_P+\omega_S$ at a wavelength 630 nm, within the preferred red spectrum. This red output passes through a beam divider such as a dichroic mirror 84 to output a red beam 86.

A second harmonic generator 90 produces a laser beam at a frequency $2\omega_P$, twice the frequency $\omega_P$ of the output of the diode pumped laser 80. The second harmonic generator 90 can be a non-linear element either placed inside the cavity of pump laser 80 or a QPM single pass LiNbO$_3$ crystal external to laser 80, or a separate diode pumped laser that is independent of the diode laser 80 but outputs a laser beam having a frequency that is approximately $2\omega_P$. This output, after being divided by a beam splitter 92, and thereafter redirected by another mirror 94 produces on output beam 96 a green output source $\omega_{GREEN}=2\omega_P$ having a wavelength of 532 nm.

The beam splitter mirror 92 also passes the other part of its input including the signal at the frequency $2\omega_P$ to a beam combiner 94, for example a dielectric mirror coated for high transmission at 532 nm and high reflection at 3400 nm to reflect the idler $\omega_i$ from the dichroic mirror 84. Although not required, it is preferable that the beam divider 84 be a dichroic mirror that is frequency sensitive so as to divert the two signals $\omega_{RED}$ and $\omega_i$ in different directions.

The idler $\omega_i$ and the frequency doubled signal $2\omega_P$ are combined in an optically non-linear element 98 which produces a blue signal $\omega_{BLUE}$ that has a sum frequency, $2\omega_P+\omega_S$ corresponding to a wavelength of 460 nm in the blue. To promote efficient summing, the non-linear element 98 can be quasi-phase-matched having a period of 7.5 μm in poled LiNbO3.

According to this structure, one type of laser can produce a tri-color output.

Figure 10:
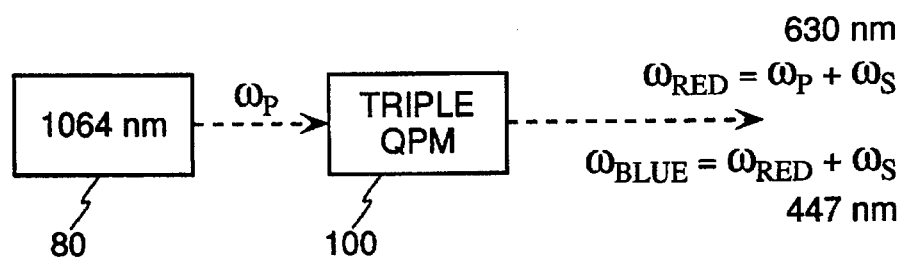

Another multi-color laser system is suggested by the reported experiment. As schematically illustrated in FIG. 10, the pump signal cop at wavelength 1064 nm produced by the diode-driven Nd:YAG laser 80 is incident upon a non-linear medium 100, such as the previously described LiNbO$_3$ crystal, impressed with three QPM gratings. The first grating has a period $\Lambda_1$ of about 29 μm to parametrically produce an intense resonant signal $\omega_S$ at a wavelength of 1540 nm. The idler signal $\omega_i$ at 3400 nm is not further used. The second grating has the previously mentioned period $\Lambda_2$ equal to 11 μm that promotes the non-linear summing of the pump frequency $\omega_P$ and the resonant singnal $\omega_S$ to produce a red signal $\omega_{RED}=\omega_P+\omega_S$ at a wavelength of about 630 nm. Yet a third grating has a third period $\Lambda_3$ of 4.3 μm in LiNbO$_3$ chosen to promote another summing process between the generated red signal $\omega_{RED}$ and the resonant signal $\omega_S$ to produce a blue signal $\omega_{BLUE}=\omega_{RED}+\omega_S$ with a wavelength of about 447 nm. The two QPM gratings in addition to the single grating reported for the experiment increase the efficiency for an inherently difficult three-step non-linear process. The red and blue signals can be separated for independent modulation by standard techniques, such as dichroic filters or mirrors.

The invention thus provides a structure and method that can produce an intense optical signal at a wavelength that is nearly freely chosen. The dual non-linear process of the invention can nonetheless be accomplished with a structure that is relatively simple and easily achievable within the present fabrication technology.

What is claimed is:

1. A laser system, comprising:
   a source of laser energy providing an optical pumping signal at a first wavelength;
   first and second mirrors defining therebetween an optical cavity receiving therein said optical pumping signal; and
   a non-linear medium disposed within said optical cavity between said mirrors, receiving said optical pumping signal, and having formed therein one or more quasi phase matching gratings having one or more respective periods chosen to cause said laser pumping signal to interact with at least one of said gratings to parametrically produce a resonant signal at a second wavelength and to cause said resonant signal to interact with at least one of said gratings to non-linearly produce an output signal at a third wavelength;
   wherein at least one of said first and second mirrors are coated to preferentially reflect said resonant signal over said output signal to thereby confine said resonant signal within said optical cavity but to allow larger portions of said output signal to exit said optical cavity.

2. The laser system of claim 1, wherein said third wavelength is shorter than said first wavelength.

3. The laser system of claim 1, wherein said first mirror's coating also preferentially transmits said first wavelength.

4. The laser system of claim 1, wherein said output signal at said third wavelength is the result of a summing process in one of said quasi phase matching gratings of said first wavelength and said second wavelength.

5. The laser system of claim 4, wherein said output signal is summed in the same quasi phase matching grating as that which parametrically produced said second wavelength.

6. The laser system of claim 5, wherein said output signal is quasi phase matched at the third order of the quasi phase matching grating.

7. The laser system of claim 1, wherein said first and second mirrors are disposed directly on the ends of the non-linear medium.

8. The laser system of claim 1, wherein the non-linear medium is periodically poled LiNbO$_3$.

9. The laser system of claim 1, wherein the optical pumping signal is near 1000 nm.

10. The laser system of claim 1, wherein the optical pumping signal source is from a laser diode-pumped Nd:YAG laser operating at 1064 nm.

11. The laser system of claim 1, wherein said resonant signal is in the wavelength range of 1400 nm and 1600 nm.

12. A laser system, comprising:
   a source of laser energy providing an optical pumping signal at a first wavelength;
   three or more mirrors defining therebetween an optical ring cavity receiving therein said optical pumping signal; and
   a non-linear medium disposed within said optical ring cavity receiving said optical pumping signal, and having formed therein one or more quasi phase matching gratings having one or more respective periods chosen to cause said laser pumping signal to interact with one of said gratings to parametrically produce a resonant signal at a second wavelength and a non-resonant idler at a third wavelength and to cause said resonant signal to interact with at least one of said gratings to non-linearly produce an output signal at a fourth wavelength,
   wherein said mirrors are coated to preferentially reflect said resonant signal to thereby confine said resonant signal within said optical cavity but to allow larger portions of said output signal to exit said optical cavity.

13. The laser system of claim 12, wherein said mirror receiving optical pumping signal also preferentially transmits said first wavelength.

14. The laser system of claim 12, wherein said output signal at said fourth wavelength is the result of a summing process in one of said quasi phase matching gratings of said first wavelength and said second wavelength.

15. The laser system of claim 14, wherein said output signal is summed in the same quasi phase matching grating as that which parametrically produced said second wavelength.

16. The laser system of claim 15, wherein said output signal is quasi phase matched at the third order of the quasi phase matching grating.

17. The laser system of claim 12, wherein said mirrors are disposed directly on the ends of the non-linear medium.

18. The laser system of claim 12, wherein the non-linear medium is periodically poled $LiNbO_3$.

19. The laser system of claim 12, wherein the optical pumping signal is near 1000 nm.

20. The laser system of claim 12, wherein the optical pumping signal source is from a laser diode-pumped Nd:YAG operating at 1064 nm.

21. The laser system of claim 12, wherein said resonant signal is in the wavelength range of 1400 nm and 1600 nm.

22. The laser system of claim 12, where there are four mirrors arranged in a linear ring cavity.

23. A multi-color laser system, comprising:

a source laser providing an optical pumping signal at a first wavelength;

a singly resonant optical parametric oscillator cavity to receive a portion of the optical pumping signal;

a non-linear medium disposed within said optical parametric oscillator cavity, and having formed therein one or more quasi phase matching gratings having one or more respective periods chosen to cause said laser pumping signal to interact with one of said gratings to parametrically produce a resonant signal at a second wavelength and a non-resonant idler at a third wavelength and to cause said resonant signal to interact with said first pump wavelength to produce a sum frequency output at a fourth wavelength; and a source laser at a fifth wavelength which is approximately twice the frequency of the first wavelength, and which is non-linearly combined in a second non-linear medium with said non-resonant idler third wavelength to produce an additional sum frequency output.

24. The multi-color laser system of claim 23, wherein at least one of the two non-linear mediums are periodically poled $LiNbO_3$.

25. The multi-color laser system of claim 23 wherein said first wavelength is produced by a laser diode pumped Nd:YAG laser and is about 1064 nm.

26. The multi-color laser system of claim 25, wherein the optical parametric oscillator resonant signal is in the range of 1400 nm to 1600 nm to produce a sum frequency with the first wavelength in the range of 605 nm to 639 nm.

27. The multi-color laser system of claim 25, wherein the associated idler wavelength at said third wavelength is in the range of 4433 to 3176 nm and combines with the second harmonic of the first wavelength at said fifth wavelength to produce a sum frequency in the range of 475 nm to 456 nm.

28. The multi-color laser system of claim 23, wherein the source laser at said fifth wavelength is produced by a separate laser diode pumped solid-state laser, first having been doubled to its second harmonic.

29. The multi-color laser system of claim 28, wherein the laser diode pumped solid-state laser is Nd:YAG with a second harmonic of 532 nm.

* * * * *

UNITED STATES PATENT AND TRADEMARK OFFICE
CERTIFICATE OF CORRECTION

PATENT NO. : 5,640,405
DATED : June 17, 1997
INVENTOR(S) : Richard W. Wallace, Walter R. Bosenberg, Jason L. Alexander It is certified that error appears in the above-indentified patent and that said Letters Patent is hereby corrected as shown below:

Title page, item [73], change

"Assignee: Lighthouse Electronics Corporation," to

--Assignee: Lightwave Electronics Corporation--:

Column 3, line 55, change "redlens" to --radians--:

Column 6, line 45, change "A" to --$\wedge$--:

Column 12, line 12, change "are" to --is--.

Signed and Sealed this

Twenty-eighth Day of October, 1997

Attest:

BRUCE LEHMAN

*Attesting Officer*  *Commissioner of Patents and Trademarks*